United States Patent [19]
Watt

[11] 3,782,364
[45] Jan. 1, 1974

[54] METHOD FOR DETECTING AND RECORDING ABNORMAL HUMAN EYE RESPONSES

[76] Inventor: John R. Watt, 2140 Peachtree Rd. Apt. 404, Atlanta, Ga. 30309

[22] Filed: Dec. 20, 1971

[21] Appl. No.: 209,623

[52] U.S. Cl. .................... 128/2 T, 351/7, 128/76.5
[51] Int. Cl. .......................... A61h 5/00, A61b 5/00
[58] Field of Search ..................... 128/2, 2 T, 76.5; 351/5, 6, 7

[56] References Cited
UNITED STATES PATENTS

| | | | |
|---|---|---|---|
| 2,573,464 | 10/1951 | Lowenstein | 351/7 |
| 3,036,568 | 5/1962 | Stark | 128/2 T |
| 2,445,787 | 7/1948 | Lilienfeld | 351/7 |
| 3,277,888 | 10/1966 | Otwell | 128/76.5 |
| 2,288,216 | 6/1942 | Tillyer | 351/7 |
| 3,598,107 | 8/1971 | Ishikawa | 128/2 T |
| 3,388,646 | 6/1968 | Sullivan | 351/7 UX |

*Primary Examiner*—Aldrich F. Medbery
*Attorney*—Patrick F. Henry

[57] ABSTRACT

This invention is believed especially useful for detecting and recording drug abuse and chemically or disease caused abnormalities in eye behavior. Its principal proposed method is to photographically record visible changes in the eyes caused by certain stimuli, including the intensity of ambient light.

The subject person is positioned so that his eyes are first photographed at short range by a "POLAROID"-type of camera in a regulated amount of light. Then the light conditions or other stimuli are changed in ways which normally stimulate known changes in the pupil sizes or direction of view, and a second photograph is recorded preferably on the same photo print alongside the previous image. At the same time the face of the subject is photographed for positive identification. The eye images can be photographed accurately enough to allow measuring the pupil diameters within acceptable limits of accuracy.

For further data, it may also be desirable to photograph more than two pictures of each pupil on the same print: one pair with a standard level of illumination or stimulation, the others with different amounts of illumination or different stimulations.

Apparatuswise, several embodiments of this system are possible. In one, the "POLAROID"-type camera can be mounted in one end of a "look-in" box, which has a face hole for the subject. This would have lights within to illuminate the subject's eyes with different and controlled amounts of illumination, starting with comfortable soft light and increasing greatly, all operated by a timing system which includes sequential timing switches electrically connected to the camera shutter and to the lights.

The camera or its view could be shifted in position slightly between successive photographs so as to put one image above, below or beside the other, or the subject's eyes could be induced to shift slightly from one side to the other between photographs, accomplishing the same result.

Instead of changing the light level as the stimulus, other embodiments of this system use other stimuli such as moving objects, verbal or pictorial stimuli, or psychological media. Either way, eyes which are drugged or are affected by certain nervous disabilities, photograph differently from normal ones.

25 Claims, 19 Drawing Figures

PATENTED JAN 1 1974 3,782,364

INVENTOR.
JOHN R. WATT
BY
Patrick D. Henry
ATTORNEY

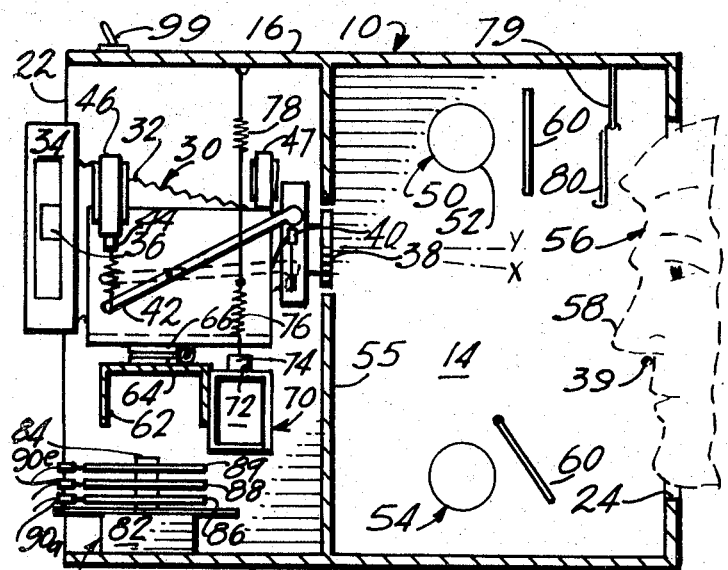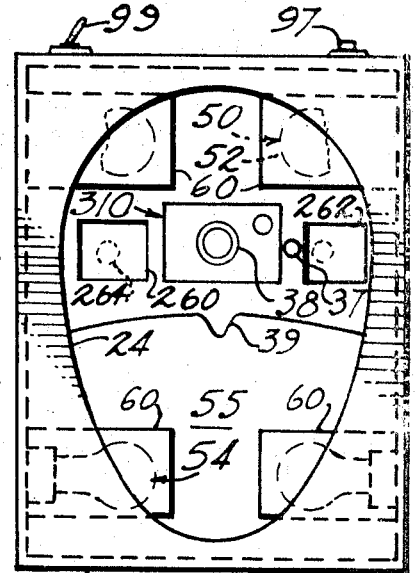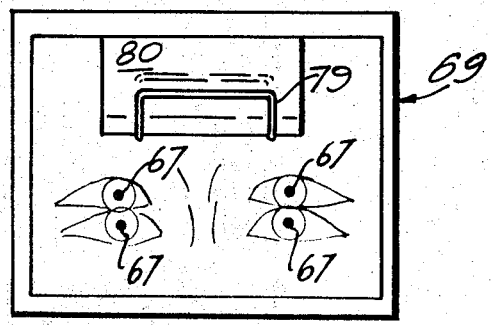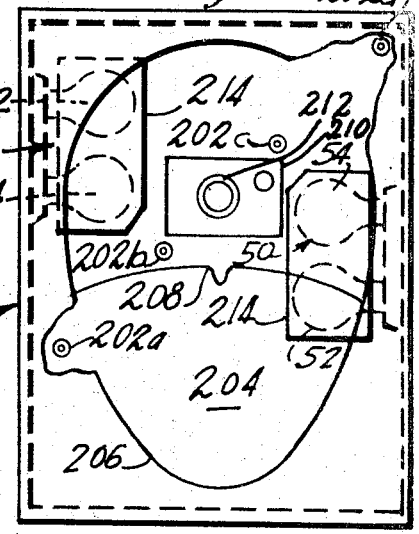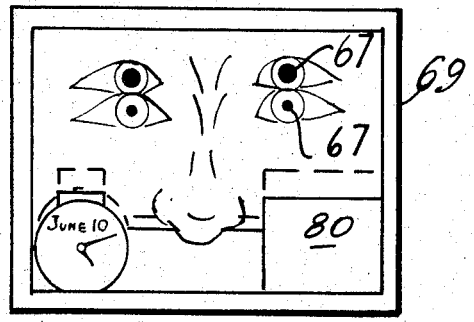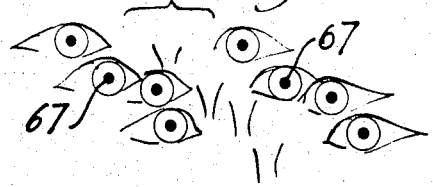

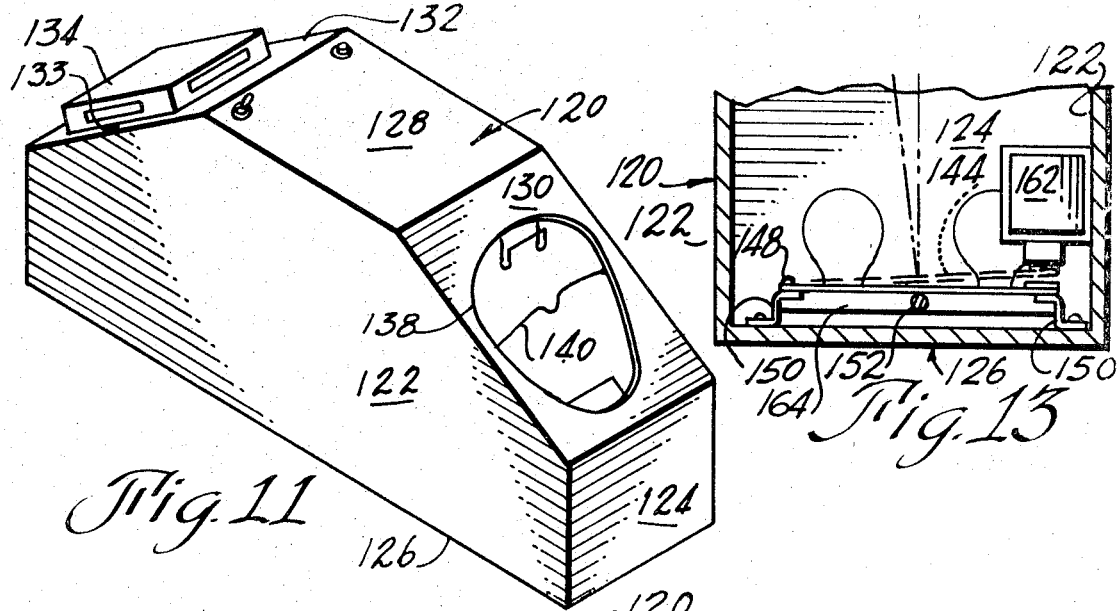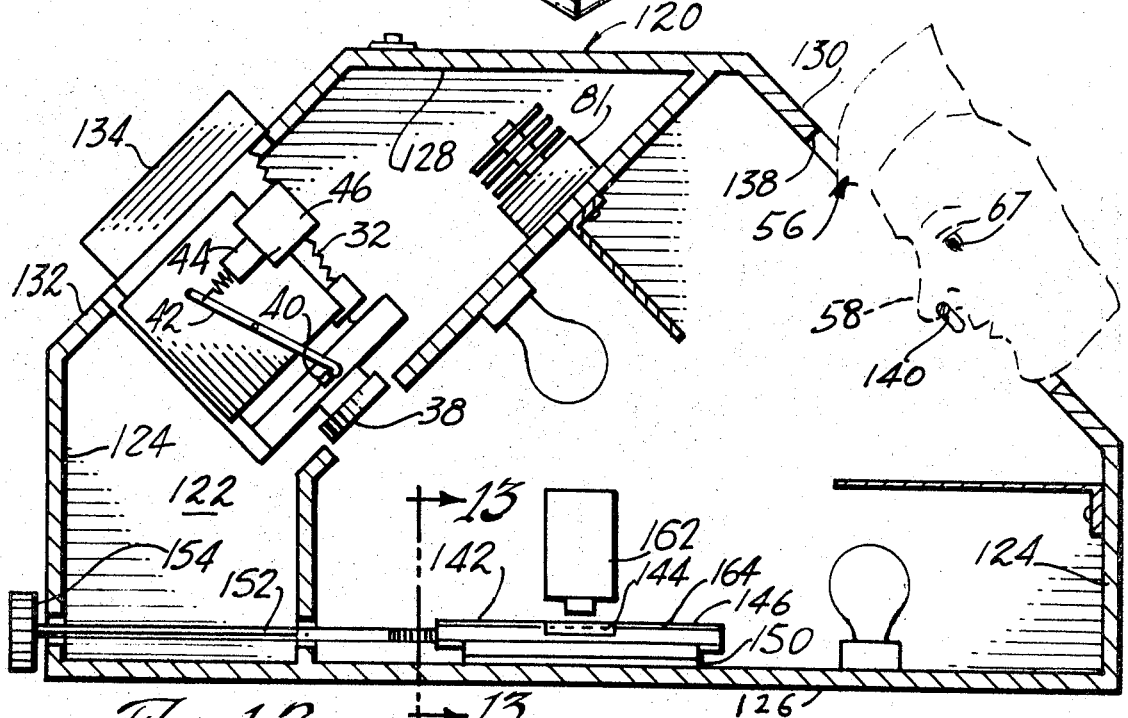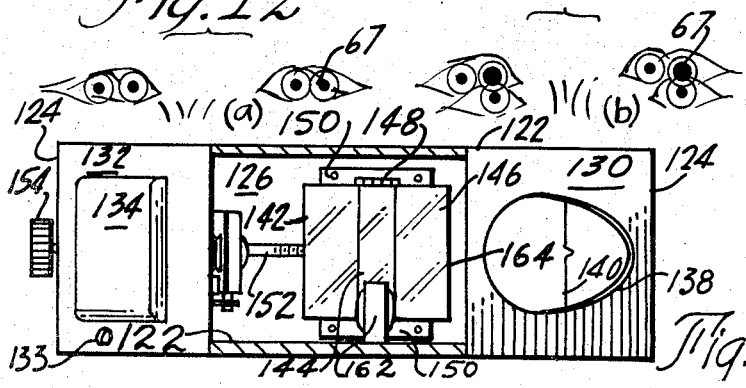

PATENTED JAN 1 1974 3,782,364

INVENTOR
JOHN R. WATT
BY Patrick Henry
ATTORNEY

METHOD FOR DETECTING AND RECORDING ABNORMAL HUMAN EYE RESPONSES

BACKGROUND OF THE INVENTION

1. Field of the Invention

Medical diagnosis and testing especially eye examination equipment. Photographic image recording; camera equipment having automatic operating means such as customer self-portrait booths and the like. Field of the invention could consider the following: 95/1.1, 11EM (&BS); 355/67; 352/121; 128/2T*, 2R, 2A.

2. Description of the Prior Art

The State-of-the-Art insofar as diagnosis of drug or other impairment of the eyes is concerned, includes the usual medical diagnosis made by physicians and other well-qualified medical diagnosticians. This often includes shining bright lights into the pupils of the eyes to observe responses. Only highly qualified personnal can reach competent judgements with this type of testing.

In the absence of such highly qualified personnel, usually specialized forms of medical doctors, it is highly questionable that such diagnosis could be used for legal purposes, such as commitment for treatment or on criminal charges.

From the standpoint of apparati, there are cameras, such as that shown in U.S. Pat. No. 2,492,646, which automatically change the lens opening for each exposure for ordinary photographic uses, but not for diagnostic purposes like the present invention. There are camera systems such as that shown in U.S. Pat. No. 1,946,323 which provide positioning means for the subject, an automatic camera which takes several pictures in sequence, and lighting means which changes the illumination for each exposure for the purpose of making different pictures at different conditions in order to get a cross-section of exposures to ensure finding the optimum one. This is also a common thing done by photographers, who very often change lens openings, shutter speeds, and even film to get different photographic effects. These practices are not related to the present invention. The prior art cameras are also not suitable for posing suspected drug addicts and photographing multiple images to determine and record their guilt or innocence. Similarly, they cannot record nervous diseases affecting eye muscles, except in the most advanced and obvious cases.

SUMMARY OF THE INVENTION

The present method could be practiced by non-medical personnel such as police, hospital attendants, school officials, company personnel officers, and even untrained clerical personnel: to that extent it resembles the balloon-type tests given by police in some states to detect the presence of alcohol in the body of a driver. It removes the necessity for highly qualified medical personnel being present and makes unnecessary more complex biochemical procedures with urine or blood samples. Furthermore, to the subject, the procedure is merely that of being posed comfortably and photographed, which is less objectionable than being fingerprinted and does not require any intrusion upon the subject's body.

By taking two or more photographs of the subject-'eyes in ways which detect abnormal responses, it is possible to record those responses on permanent photographic paper, removing any future question of what existed at that time. The facial photographs make almost impossible the substitution of one person for another, as occurred in Vietnam where drug addicts among U.S. servicemen reportedly paid non-addicts $100 or more to be urine tested in their place. This involved a simple substitution of name and identification, not possible under this photographic method.

Since the appearance of the eyes in two or more adjoining images is readily viewable by anyone without subjective judgements, the procedure is quite quick and uncomplicated and many persons can be examined in a short period of time. Thus, one primary object of the present invention is to provide a better means for quickly detecting certain diseases or drug or other chemical influence, which may be operated at any place without legal complications or subjective judgements, and which creates instantaneous unchangeable, permanent records for future verification.

Through the use of basically conventional "POLAROID"-type film, the muscular operation of the subject's eyes may be photographed in a minute or two upon film which provides a permanent print in another minute or less. However, photographing them upon moving-picture film or recording them on video tape is equally possible, but less convenient.

Another object of this invention is to provide a diagnostic camera apparatus into which the subject looks while being photographed automatically and in which a sequence of two or more photographic images may be made on the same paper under different conditions of light intensity or other external stimulation.

BRIEF DESCRIPTION OF THE DRAWINGS

FIG. 4 is a substantially vertical medial cross-sectional view taken thru the box shown in FIG. 2 with a subject looking therein.

FIG. 5 is an elevation view looking into the right end of the box shown in FIGS. 2 and 4.

FIG. 6 is a diagrammatic and illustrative view of a photographic print made by the proposed method, showing abnormal eye reactions.

FIG. 7 is a diagrammatic and illustrative view of a similar photographic print of the eyes of a subject showing normal reactions, i.e., the pupils have changed in size due to light change or other stimulation.

FIG. 8 is an elevation view of a modification called the "moving object" version.

FIG. 9 is a diagrammatic illustrative view of a series of eye images photographed by the latter system, which shows abnormally small pupillary change after changes in stimuli, also poor ability of the eyes to follow a moving object.

FIG. 10 is a diagrammatic view of a corresponding series of normal eye images recorded on one print.

FIG. 11 is a perspective view of a modified form of the camera apparatus.

FIG. 12 is a cross-sectional view taken substantially vertically and medially through the apparatus shown in FIG. 11.

FIG. 13 is a partial cross-sectional view taken along lines 13—13 in FIG. 12.

FIG. 14a, b, and c is a diagrammatic illustration view of the images produced by the apparatus shown in FIGS. 11 thru 13, inclusive.

FIG. 15 is a plan view of the device in FIG. 12 with top removed.

DESCRIPTION OF ONE PREFERRED EMBODIMENT

Figure 1:
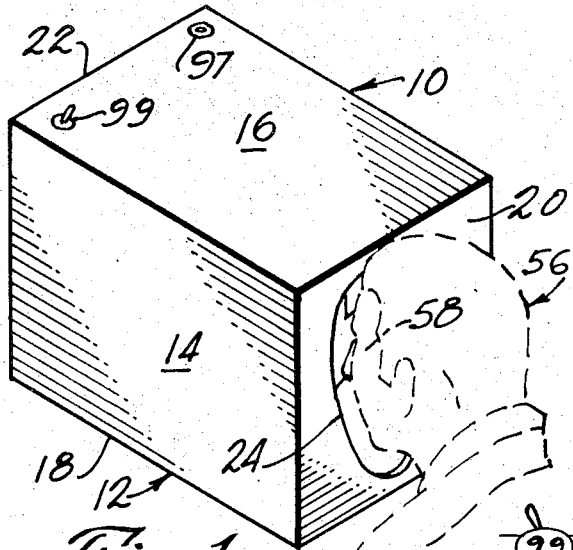
FIG. 1 is a perspective view of one form of the apparatus.
Figure 2:
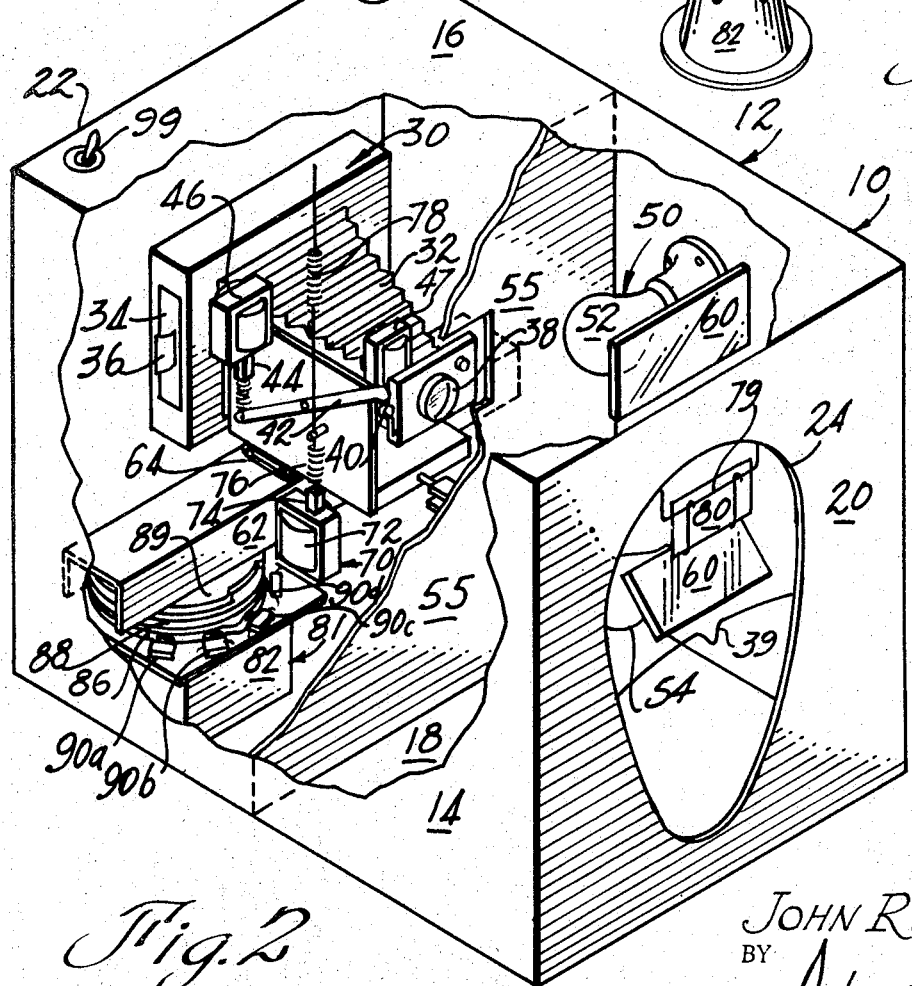
FIG. 2 is a perspective view of the apparatus shown in FIG. 1 with portions of the box broken away, exposing the "POLAROID" camera and various controls and lights.

With reference initially to FIGS. 1 and 2, a unit designated generally by reference numeral 10 comprises a generally closed box 12, which may be constructed from plywood or other sheet material with sides 14, top 16, bottom 18, front 20 and rear 22. A face opening hole 24 is cut into the front panel 20. Mounted before the rear panel 22 is a modified "POLAROID" or other camera using self-developing film. This is designated generally by reference numeral 30 and shows the usual bellows 32, a film package 34 with a tab 36, which is pulled to remove and develop the exposed print, a lens arrangement 38 and a shutter cocking-lever 40. The conventional "POLAROID" camera also has an automatic light-meter arrangement for shutter control which governs the amount of light passing through the lens; this controls the exposure of each print. The shutter cocking mechanism has been modified to include a lever 42 having one end against the shutter cocking member 40 and the other end connected through a spring to the plunger and armature 44 of a solenoid 46, which is operated in response to an electrical current and thus pushes the shutter cocking member 40 downward. Thus, the shutter-cocking lever 42, the undesignated spring which absorbs shock, and solenoid 46 serve to reset the shutter for each successive exposure. A second solenoid 47, mounted close behind the shutter in FIGS. 2 and 4, actually releases the shutter and makes the photographic exposures. Its details are not shown; however, a hidden armature carries a spur, which, when pulled upward, triggers the shutter.

Electric light bulbs 50 are mounted within the box 12 in separate arrangements of banks of bulbs. One bulb or pair of bulbs 52 provides a low level of illumination for initial lighting, and a second bulb or pair of bulbs 54 provides a higher level. Bulbs 52 and 54 are shielded by small baffles 60 to keep direct glare from the subject's eyes. The bulbs 50 illuminate the partition 55 within the box 12, which may be coated to reflect the light diffusely back to the subject's face 56 in the opening 24. Baffles 60 may be translucent to protect the face from both direct glare and shadows.

The camera has its lens 38 focused in normal camera fashion on the subject's face 56 in the opening 24. The subject is positioned by a nose member 39, which is a wire secured across the face opening 24, and having a notch in its center to receive the lower web of his nose 58.

With reference to FIG. 4, it is seen that the camera 30 is mounted on a stationary frame member 62 across the inside of box 12 on a hinge 64 having one side connected to the bottom 66 of the camera and the other side connected to the frame member 62. The hinge 64 arrangement provides a pivoted base which allows the camera to tilt a few degrees vertically between exposures, specifically through the angle shown in FIG. 4 through lens 38. This prevents the two sets of eye pupils 67 taken in one observation (as in FIG. 6) from merging on the final photographic print. Instead, one pair of pupils prints slightly above or below the other, not directly superimposed upon it. This allows easy comparison and measuring of the printed images as seen in FIGS. 6 and 7.

FIG. 6 also illustrates a wire frame 79 for holding the subject's driver's license or other identifying card. FIG. 7 shows such a card at the lower right, with a calendar-type watch at the lower left to record the day and time of examination upon the resulting films.

Camera 30 is tilted a limited small angle to separate the pupil images as shown on photo print 69 in FIGS. 6 and 7, by means of a solenoid control 70 comprising a solenoid 72 having an armature 74 operating a spring control member 76 which is a shock absorber protecting camera 30 from the full shock of the instantaneous solenoid 72 pull. The top spring 78 assists in returning the camera to normal position when the solenoid 72 is released adn relaxes.

Figure 3:
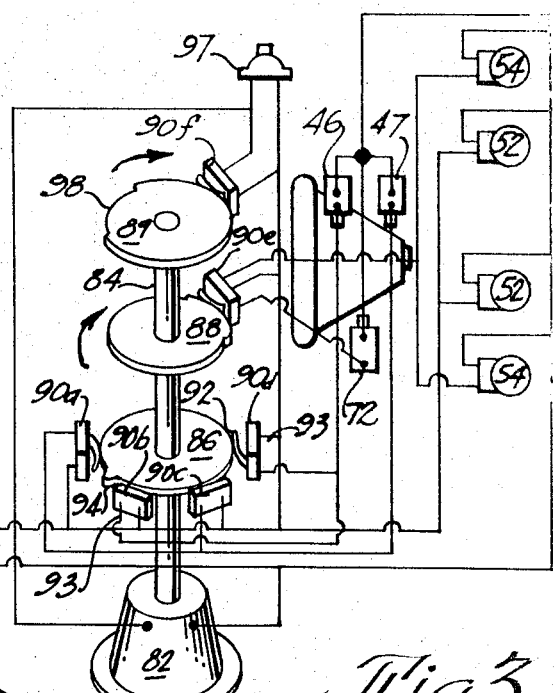
FIG. 3 is a perspective view of a sequential cam timer controlling the camera and lights shown in FIG. 2.

The automatic operation of camera 30 and the lights 50, etc. is controlled by an electric timing apparatus designated generally by reference numeral 81 and comprising an electric motor (not shown) in housing 82 operating a shaft 84 having a plurality of cam discs 86, 88, 89 mounted thereon for rotation therewith, which operate six different lever-type micro-switches designated 90a, 90b, 90c, 90d, 90e, and 90f. All are of the "normally-open" style, except the last. Thus, in the first five, the circuits are open until externally closed; in the sixth, the circuit is closed until externally opened. FIG. 3 shows the timing system.

Each micro-switch 90a, etc. has a spring-type lever 92 pressing against the periphery of its respective cam; the respective levers 92 are switch actuators which move in response to the edges of each respective cam member 86, 88 or 89 to cause the respective micro-switch 90a, etc., to open or close the electrical circuits to which the mirco-switch 90a, etc., are connected by wires 93. Areas on the respective outer edges of cams 86, 88 or 89 which are recessed and therefore have no projections pressing the switch contact members 92 inward, represent the open positions of the switch contacts. The lowermost cam 86 has one narrow projection on its rim at 94 and stationed around cam 86 in relatively close association are four separate micro-switches 90a, b, c, and d; as the cam 86 revolves, the projection in quick succession briefly closes and then reopens the respective switches 90a, b, c, and d. Micro-switches 90b and 90d are connected in parallel and operate solenoid 46 which cocks the camera shutter via cocking lever 42; and micro-switch 90b, which is between micro-switches 90b and 90d and its counterpart 90a are similarly connected in parallel and operate the solenoid 47 which releases the previously cocked shutter through members not shown. Thus, as the cam 86 revolves, the shutter of camera 30 is cocked and released, then cocked and released again and so forth. One complete cycle in this style of diagnostic system makes two exposures a few seconds apart on the same film. The next cam 88 turns at the same speed as cam 86 and in fixed relation on shaft 84 with it. Cam 88 has one sustained cut-out rim which closes the major circuit of micro-switch 90e for about 75 per cent of the cam periphery. This activates the solenoid 72 and through spring 76 tilts the camera downward and holds it there against the force of the return spring 78.

The micro-switch 90e has a second circuit within it, which opens when the other one closes, and vice versa. This second circuit is connected to the high level illumination lights 54. When the cam 88 presses the micro-switch lever 92 on micro-switch 90e and opens the solenoid 72 circuit, this allows spring 78 to tilt the camera back to its normal position and the second circuit turns on the lights 54. These augment the previously lighted bulbs 52 to increase the illumination on the subject's face.

Cam 89 has one micro-switch 90f. This is the normally closed one noted earlier. The cam 89 has no projections but only the cut-out section 98. As noted, when this section 98 reaches the micro-switch 90f lever 92, the circuit is opened. It is connected to the electric motor 82 which drives the three cams 86, 88 and 89. Thus, the effect of cam 89 and its switch 90f are to stop the electric motor and the cams at the same point at the end of each photographic cycle.

When cam 89 has opened the timing motor circuit by means of micro-switch 90f, the machine cannot start itself. However, a manual push-button switch 97 is provided for human start-up. This is connected in parallel with micro-switch 90f and, when pressed, over-rides the latter.

Thus, when push-button 97 is pressed, the motor starts and, in a second or two, cam 89 activates its micro-switch 90f which closes the motor circuit for the whole cycle. After this point, opening the push-button circuit has no effect: micro-switch 90f then keeps the motor running through all the planned steps, which are listed below, then shuts it off, awaiting further manual operation.

One final component is overall shut-off switch 99. This opens and closes both of the lines bringing current into the system. It manually disconnects all the various circuits from the external source of power.

When this switch 99 is closed, power becomes available to all circuits. However, only the low-level lamps 52 turn on directly. They are used continuously during the whole photographic cycle, so are not connected to any of the cam-operated switches as are all the various intermittent devices including the high-level lights 54.

The overall inter-relation of the cams 86, 88 and 89, and their micro-switches 90, etc. is such that the following sequence occurs in each picture-taking cycle. First, the power is turned on, lighting the lower-level lamps 52. Then:

1. The camera 30 is tilted slightly downward.
2. The shutter is cocked by the mechanism described.
3. The shutter is released, making one exposure, the upper image on such prints as FIGS. 6 and 7.
4. The camera 30 tilts up to normal position, and the high-level lights 54 turn on.
5. The shutter is cocked again.
6. The shutter is released, making a second exposure on the same film, at a slightly higher angle Y in FIG. 4; by lens-inversion this becomes the lower image on such prints as in FIGS. 6 and 7.
7. The high level lamps 54 are shut off.
8. The motor and the cams 86, 88, 89 stop, as micro-switch 90f opens.
9. The whole machine awaits external start-up, all circuits off except for the low-level lamps 52 which remain on until shut-off switch 99 is opened.

Having the low-level lamps 52 on semi-continuously serves three purposes: first, they tell the operator when the machine is ready to operate; second, they allow the subject to see inside the box before he places his face in it, (this allays some possible fears); third, they let the latter's eyes, previously adjusted to the room level of illumination, become better adjusted to that used for the first exposure.

These primary lamps 52 give a standard amount of light, so the subject's pupil size when exposed to it is a matter of extreme interest when recorded by the camera. The extra time allowed the eyes for adjusting to its fosters accuracy. In many cases where drugs or chemicals are involved, the mere size of the pupil recorded in the first exposure is highly important.

Similarly, the high-level illumination 54 is turned on for about three-quarters of a second before the second exposure is made. Since there are indications that normal drug-free eye pupils should complete full adjustment to suddenly increased light-levels in a half-second or less, the camera gives ample time for persons whose eyes naturally react slowly.

While exact timing data is not yet known, it is expected that normal pupils unimpeded by disease or drugs will photograph with a marked decrease in diameter, as in FIG. 7. However, with eye-muscles slowed by such influences, the pupils will photograph substantially as in FIG. 6, where the allotted time has not been adequate for visible adjustment by the sluggish muscles involved.

EMBODIMENT WITH OPTICAL IMAGE SHIFT

It is essential that the two sets of eye images fall separately upon the film. Instead of the subject moving his face between exposures, or moving the camera slightly to achieve this (as described previously in connection with FIGS. 1 et al.), an alternative method and apparatus is found in FIGS. 11 thru 13, inclusive, and FIG. 15 in the form of an optical system for displacing the two sets of images the necessary small distance while the camera is stationary. There are several advantages to this: first, the apparatus and hardware for controlling the camera is simplified; second, the optical system can use a mirror or a prism to selectively displace only the image of the eye area, leaving the remainder of the face and particularly the identification and other areas totally unaffected and unblurred; third, such an optical system can also magnify or enlarge the eye area, leading to greater accuracy; and fourth, a more convenient shape of table-top box cabinet can be used.

Finally, this optically shifted embodiment can give clearer eye images than the camera-tilting one. In the latter, vertical image displacement tends to superimpose one set of pupils upon the eyelid and eyelash area of the other set and vice versa. The eyelids and eyelashes form an irregular background in the pupil images and the latter thus lack full visual clarity in the finished prints. However, horizontal displacement can superimpose one set of pupils upon the whites of the eyes of the other set, and vice versa, yielding a much clearer pair of images.

Such horizontal displacement can be achieved several ways: the camera can be moved or swung horizontally rather than vertically between exposures; the subject can be asked to look at a spot to the left of the lens for one exposure and at another to the right of it for the second; or one image can be shifted, as here, by a tilting mirror or prism. However done, the general result is shown in FIG. 14a. If an enlarging mirror or prism is used, the eye images here can be much larger than those depicted in FIGS. 6 and 7, with correspondingly greater ease of analysis.

It should be noted that the camera-tilting apparatus shown in FIGS. 2 and 4 can be combined with the apparatus in FIG. 11 if for any reason both systems should be needed, as for example where it is advisable to have alternative methods and procedures for legal reasons.

The apparatus is shown generally in FIG. 11 and designated by reference numeral 120 comprises a box having sides 122, ends 124, a straight bottom panel 126 and a flat top 128. There are also slanted end panels extending from ends 124 to top 128 specifically a face panel 130 on one end and a camera panel 132 on the other end in which is mounted the "POLAROID"-type camera 134 which basically is the same as the camera 30 in the embodiment in FIGS. 2 and 4. However, this camera does not necessarily move as did the prior one since this has been made unnecessary and optional by shifting one exposure image optically rather than by moving the camera. Looking at the cross-sectional view in FIG. 12 it is seen that camera 134 employs the working parts such as the bellows 32, lens 38, shutter cocking-member 40, solenoid 46, lever 42 and the other parts which parallel those in the embodiment in FIGS. 2 and 4. The opening 138 in the panel 130 for the subject's face is in a perhaps 45° plane rather than the vertical plane used in the previous embodiment. This allows the cabinet to rest on an ordinary table or dask in front of the subject 56 who may be seated in an ordinary chair. The subject 56 as seen in FIG. 12 can bend forward and place his face comfortably in the opening 138 positioned by the nose member 140 across the opening 138 and the periphery of the opening 138.

The image-shifting mechanism is mounted on sliding base 164 on the bottom 126 of the box, below and between the camera and the subject's face. Specifically, the mirrors 142, 144 and 146 are located to reflect the latter's face 56 accurately into the camera lens 38.

The mirror is divided into three parts: narrow strip 144 is just wide enough to reflect a horizontal band across the face which includes the two eyes; the other two pieces 142 and 146 reflect the rest of the face. Narrow mirror 144 is hinged to base 164 by means of hinge 148, whereas the other mirror pieces 142 and 146 are mounted inflexibly upon it. Mirror-base 164 does not tilt, however it slides longitudinally upon tracks 150 on either side, which are mounted upon the bottom 126 of the box 120. Timed electro-magnet 162 tilts mirror section 144 as shown in FIG. 13.

An actuating-screw rod or shaft 152 is threaded into sliding mirror-base 164 and has an actuating knob 154 on its other end outside of the box. The operator can revolve knob 154 to slide the mirrors longitudinally within the box, specifically to adjust their location so that the tilting mirror segment 144 reflects the eyes 67 of the subject accurately into lens 38. The differing facial structures and dimensions of different subjects make this adjustment necessary. To make this adjustment, the operator looks through peep-hole 133 beside the camera and adjusts the mirrors so that the subject's eyes reflect clearly in tilting mirror segment 144, not in fixed mirror segments 142 and 146.

This adjustable feature could be eliminated by using a single large tilting mirror which reflects the whole face. This would separate the two eye exposure images as desired but would create a double exposure of the remainder of the face. Identification cards or driver's licenses, or calendar-clock devices placed in the field of view would be particularly blurred.

The purpose of the tilting mirror system described here is to visibly double-exposure only the eye area, and leave the remainder of the photograph as single-image as possible for optimum identification purposes.

The tilting mirror segment 144 could also be of enlarging or magnifying type to photograph the eye images ot larger scale than the rest of the face. This is particularly recommended and is a particular advantage of this style of system because it improves the accuracy of any diagnosis made from the resulting films.

This mirror system should allow accurate reproduction of the subject's face, because the normal left-right reversal by mirrors is compensated by the normal top-bottom inversion of cameras. Of course, prisms could be used instead of mirrors.

The tilting mirror segment 144 or a prism substitute may have a scale or grid marked upon it, as in millimeters. When reproduced in the photographic prints, this would greatly speed the measuring of pupil diameters. Such a scale may be located elsewhere in the system: in the camera lens, in the film, or in a special screen in the field of view; and any embodiment of this invention would benefit from its use.

THE MOVING-OBJECT EMBODIMENT

The two versions above of this system record the eye pupil size in a standard level of illumination and then the rate of pupil reaction to sudden changes in that light level. This records two different indications which can be used for diagnosis.

A third version of this invention is shown in FIGS. 5 and 8; in some ways it is simpler than the two forms previously discussed. It records three indications or clues and thus could be more accurate and sensitive. A conventional single-acting shutter which doen not require a special cocking action before exposure would be preferable in the camera to eliminate the double-acting shutter used in the previous designs, which seems too awkward and slow for the new system. Such shutters are well known and can be fitted to most cameras using self-developing film.

The new system specifically records the path of the subject's pupils as they follow a simulated moving object in front of his face. Normal eyes can follow such objects smoothly and exactly but many drug-affected or otherwise handicapped eyes can follow them only in lags and jerks, unable to pace themselves to match the motion.

This third system is shown in FIG. 8. Here, box 200 has a face opening 206 and a nose centering wire 208. The camera mentioned previously and identified generally by reference numeral 210 is mounted behind the rear partition 204 with the lens 212 viewing the subject's face, and baffles 214 shielding the subject's eyes from the direct flare of the main illumination bulbs 50. The lights 202, a,b,c and d form a diagonal line in the subject's direct vision: light 202a low at the left, light 202d high at the right, lights 202b and c spaced equally between them. These lights are colored to attract the eyes, but contribute little or no light to the photography; they merely simulate a moving object crossing the subject's view.

They are placed diagonally to test two sets of eye muscles: those which control vertical movement and those which control horizontal movement. Sluggishness in either will be detected.

Figure 16:
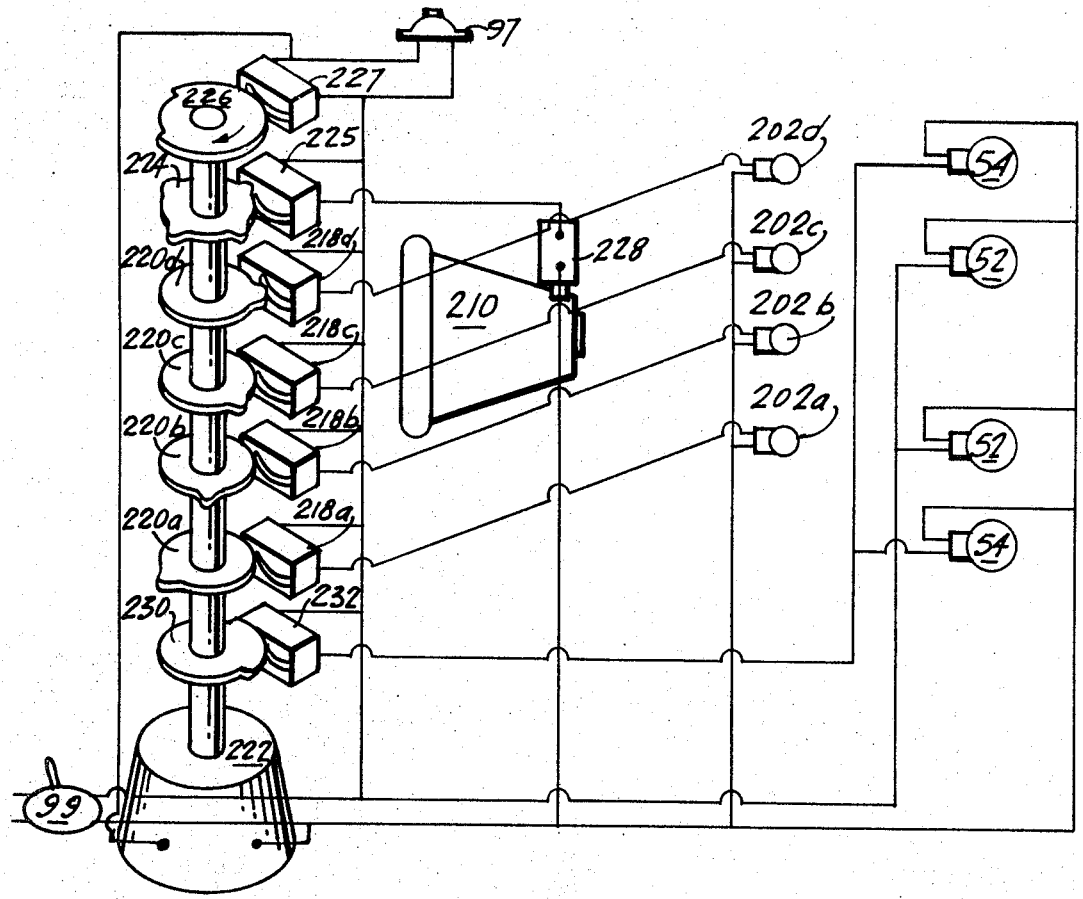
FIG. 16 is an electro-mechanical diagram of the operation of the moving-object embodiment shown in FIG. 8.
Figure 17:
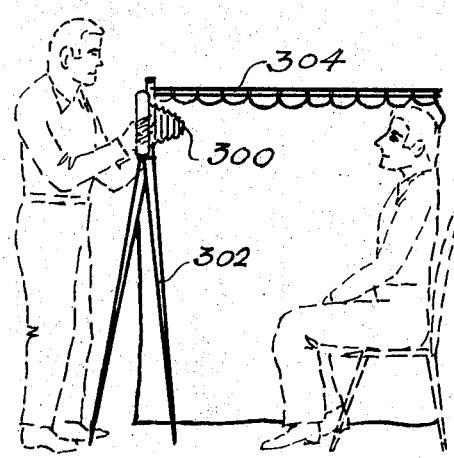
FIG. 17 is a diagram of a simple arrangement which can be used to practice the method.

The main illumination bulbs 50 are in two banks. The primary lamps 52 provide the original or low-level illumination; the secondary ones 54 turn on to provide high-level lighting, timed by a cam system similar to that discussed in conjunction with FIGS. 2 and 4. FIG. 16 illustrates the wiring and timing.

Lights 202a, etc., are connected to respective micro-switches 218a, b, c, and d, operated by cams 220a, b, c, and d, driven by motor 222. The cams 220 have single, relatively narrow projections and as they revolve they successively close and open the micro-switches 218a,b,c, and d. This makes them light briefly in succession, but with irregular time intervals between them. The motor 222 drives another cam 224 in fixed relation to cams 220. This second cam has four projections which successively close and open the micro-switch 225 which in turn energizes the solenoid 228, which simultaneously cocks and releases the shutter of the camera 210.

The subject is instructed to follow the colored lights with his eyes. The various micro-switches and the cam projections are ao timed that a fraction of a second after each of the four colored lights blink on, the camera photographs his eyes. A sixth cam 226 and its micro-switch 227 stop the motor 222 at the end of the cycle in the manner discussed earlier.

A final cam 230 and micro-switch 232 would turn on the bright lights 54 just after the last colored light turns on, and turn them off after the camera operates.

Example: This apparatus could employ an Eagle Signal Co. Model E–71 commercial timing device with 7 cams on a single shaft, each one operating one respective micro-switch. It would be possible to eliminate micro-switch 225, and trigger the camera with the colored-light micro-switches 218 a, b, c and d by connecting the solenoid 228 to each of these circuits but through a brief-timed delay relay. The latter would trigger the camera a fraction of a second after each colored light blinks on.

METHOD OF OPERATION

This combined system has this sequence of events, starting with low-level lights 52 already on and the subject instructed to watch the colored lights. These occurrences follow:

1. Colored light 202a turns on long enough to attract normal eyes.
2. The shutter photographs the position of the subject's pupils and face.
3. Colored light 202b turns on long enough to attract normal eyes.
4. The shutter makes another exposure of the eyes and face.
5. Colored light 202c turns on long enough to attract normal eyes.
6. The shutter makes a third exposure.
7. Colored light 202d turns on and stays on.
8. The high level illumination lamps turn on.
9. The shutter makes its last exposure.
10. The last colored light and the high level lights go out.
11. The timing motor turns off.
12. The low level lights remain on, or (optionally) turn off.

This sequence of events should record the desired three clues concerning drug effects on the eyes.

First, the eye pupils are photographed four times as they follow the colored lights moving diagonally up a straight line. If the eyes are normally coordinated and controlled, the resulting photograph should show four pupil images for each eye, evenly spaced in sloping straight lines. Although they may be overlapping, these pupils should be uniformly spaced and in straight lines, as shown in FIG. 10.

If the eye muscles are heavy, slow, or confused, the four pupil images for each eye should be unevenly spaced and on crooked or curved lines, due to the eyes' inability to "center" or focus the pupils adequately on the colored lights by the time the camera makes its exposures. The uneven time intervals between the colored lights' successive appearances are expected to keep drugged eye muscles from following in exact pace with the simulated moving lights. The expected photograph of sluggish pupils should resemble FIG. 9.

Simultaneously, the movement of the eyes themselves as they follow the simulated object diagonally upward from left to right is expected to prevent one pupil image falling directly upon another. Although some amount of overlap may occur, the four pupil images for each eye should be reasonably distinct. No camera-tilting or mirror mechanism is needed.

Second, the pupils are photographed the first three times under the lower-level illumination. The pupil sizes may be judged accordingly. Enlargement or "pinpointing" should be visible.

Third, the final photograph occurs shortly after the high level illumination begins. If the eyes are normal, the pupils should contract in adequate time and the final exposure should record them significantly smaller, through in line with and spaced evenly with the other (and larger) images. This is shown in FIG. 10. If the pupil reactions are affected by drugs or disease, the final pupil image in each eye should be very little smaller than its predecessors, as seen in FIG. 9.

To summarize, three clues appear in one photograph. If drug or other effects are present, the four pupil images in each eye may be (1) markedly large or small, (2) be unevenly spaced in curved or crooked lines, and (3) have the last pupil images almost as large as their predecessors.

THE EMOTIONAL-STIMULATION EMBODIMENT

A fourth variation of the present general system can be utilized in some instances. It employs artificially induced emotional reaction within the subject rather than external stimuli such as lights, noise, etc., or the previously discussed system utilizing the row of colored lights. These emotional reactions make the pupils enlarge or contract even though no change occurs in light level.

In the embodiment shown in FIG. 5, on opposite sides of the camera 310 lens 38 are mounted two receptacles 260 and 262, each of which holds a small transparent color picture such as a standard 2 inch by 2 inch projector slide. Behind each of these holders is a small light 264 which illuminates its picture at the proper time, governed by micro-switches and timing cams as discussed previously.

The actual pictures used in these receptacles would be of two types: one pleasant and attractive, one repulsive or frightening. Thus, the left-hand picture might be of a beautiful girl, a friendly dog, a beaming baby, a highly popular celebrity, or even a beautiful automobile. In general, this picture should have universal appeal. If necessary, however, different pictures could be used for different classes of test subjects. Corresponding right-hand pictures might show a threatening snake or rat, a tarantula or a scorpion, a snarling dog or thug or other frightening item. It is possible again that different pictures may be needed for different people. The operating sequence would be as follows:

1. The low-level lights are already on.
2. The subject places his face in the face-opening 24, centered by guide member 39.
3. The camera tilts down slightly.
4. The subject is instructed to watch the pictures, but neither picture is lighted or significantly intelligible to attract his eyes at first.
5. The camera takes a photograph to establish the unaffected or neutral pupil size.
6. The camera tilts up to normal position.
7. The left hand (attractive or appealing) picture becomes lighted and visible. It presumably enlarges the subject's pupils via his emotions.
8. The camera 310 makes a second exposure, recording the subject's new pupil size.
9. The left picture turns off and the right-hand one (repulsive or frightening) turns on. The subjects pupils presumably contract.
10. The camera makes a third exposure and records the subjects's pupils again.

This sequence involves only one light level. It establishes on one film whether or not the subject's eyes responded to the emotional impact of the two types of pictures glowing dramatically before him. This is illustrated in FIG. 14b. Normally functioning eyes should show medium-size pupils on the first or lowest exposure. Above these would be enlarged pupils from the second exposure, and beside the latter would be contracted pupils from the third exposure. Normal eyes thus should reflect emotional stimulation, both favorable and unfavorable, in close comparison with neutral or unstimulated images.

Drug-affected eyes, or those otherwise slowed in their reactions, would presumably show three pupils of similar size, as shown in FIG. 14c, or two medium-sized pupils followed by a larger one (the dilated pupil intended for the second exposure not occurring until the third exposure).

If desired, and if the film allows four clear exposures to be made, a final exposure could be added to the sequence. After the above ten steps, these would occur:

11. The high-level lights would turn on.
12. The camera would tilt down again.
13. The camera would make a fourth exposure.

Presumably the final added light would made normal emotion-contracted pupils contract still more, and the camera would record them beside the first-exposure pupils on the print.

This general embodiment of the invention can utilize yet another physiological principle. When eyes are concentrating upon something, the pupils enlarge to better view it. This is independent of light-level, but may be psychologically related. Interest in the subject may cause this action, or mere visual difficulty of perception.

Thus, in this embodiment, the left-hand slide-picture could depict an optical illusion which both interests and confuses the eyes. The right-hand picture could be a simple landscape or diagram of no particular interest. Perhaps a simple circle would suffice to attract the eye without arousing significant interest or concentration.

The first exposure, as in FIG. 14b, would show the original pupil size; the second, the pupils expanded by interest or concentration; and the third, a disinterested size. Failure of the pupils to respond would yield the approximate picture of FIG. 14c.

Of course, these emotion-linked and interest-linked variations on the basic principle can be used with either the tilting-camera or tilting-mirror mechanisms, or with a simple direct and fixed camera. In the latter case, the resulting photograph would resemble FIG. 14a, with dual side-by-side pupil images.

COMBINATION OF TWO EMBODIMENTS

The emotion and interest linked variation can be profitably combined with the moving-object embodiment discussed earlier.

Specifically, four rear-lighted transparent pictures would replace the diagonal colored lights of that system. These four pictures might be arranged in this alternating sequence from lower left to upper right:

1. An attractive and appealing picture.
2. A repulsive or frightening picture.
3. A hIghly interesting or puzzling picture.
4. A neutral or disinteresting picture.

Thus, as these pictures face the subject's eyes in turn, the photograph would depict normal pupils in straight diagonal lines with the second and last images in each distinctly smaller than the first and third. Drug-affected pupils correspondingly would be photographed in a less even diagonal line with little size differentiation.

THE SINGLE EXPOSURE EMBODIMENT

Considerable diagnostic data can be obtained from the eyes by a single camera exposure, rather than the multiple ones discussed above. This makes possible the development of a very simple and portable device, involving little more than a camera equipped with a narrow-beamed, small spotlight and a timing device which operates the shutter. This compact device should be easily transported in a physician's or a police automobile.

For illustration, this simplified system is shown incorporated into the apparatus of FIG. 5. It is not otherwise related to the latter system, and needs neither the FIG. 5 camera-tilting mechanism nor its high level illumination bulbs 54.

To the right of lens 38 in FIG. 5 is shown the lens of the single-exposure-system narrow-beamed, small spotlight 37. This is carefully located to project light into only one of the subject's eyes, here, the right one. It substitutes for the high level illumination bulbs 54 of the FIG. 5 system, but affects one eye only.

Under test, the subject's eyes first adjust to the low level light of bulbs 52. Then the small spotlight projects its beam into his right eye. This added light causes the right pupil to contract, if not inhibited by disease or drugs.

The shutter follows the onset of that beam by perhaps a half-second, photographing normal eyes with the right pupil distinctly smaller than the left one. Sluggish eyes will be recorded with both pupils of similar size.

POSSIBLE VARIATIONS

It should not be inferred that only the above-discussed types of camera systems will serve the planned diagnostic purposes. For example, the described box enclosures are not strictly needed; the cameras 300 could be mounted on pedestals, tables, tripods 302, or even upon the wall, provided that the ambient room light is dim an constant and the subject's face is relatively fixed in location.

Second, some of the above camera assemblies could even be hand-held during the picture-taking sequence. Wire-frames 304 projecting from their fronts to help maintain constant juxtapositions with the subject's face seem advisable. These frames might carry cloth hoods to limit ambient illumination, and fold-up when not in use. Flash or strobe light units may be used. Thus, even the most complex of the above systems may be adapted to compact field or police-car use.

Third, it is not necessary to use "Polaroid" or other self-developing film. While the latter types provide permanent and easily inspected records within 1 minute, ordinary camera films can be used equally well. They handicap their users, of course, by the time-lag until they are developed and prints made for easy inspection.

Fourth, the tilting-camera and tilting mirror features can be replaced by hand or devices which move the film slightly within the camera, preferably in a horizontal direction between the exposures. A device to move the lens would also serve.

Fifth, the multiple exposures need not be recorded upon single films. Several conventional cameras now exist which allow taking separate photographs as fast as their shutter releases can be operated; thus, the different eye photographs can easily be recorded on separate prints. This would improve the quality of the photographs compared to the multiple exposure systems outlined above, but comparing the pupil's sizes and positions would be made much more difficult. Further, such cameras to date apparently can not use self-developing film.

Sixth, motion-picture cameras could be used. These would provide the most accurate timing record possible of the eye's reactions to the various stimuli presented. However, quick analysis or review would be impossible, and storing the used films would be expensive.

Finally, television cameras and video-tape units could be used. These would allow instant replay of the eye's behavior; enlarged in size and at reduced speed. Thus, trained observers could make diagnosis very accurately with this variation. However, cost, portability, and records-storage problems arise.

BELIEVED ADVANTAGES OF THIS GENERAL SYSTEM

This system seemingly has notable advantages over prior methods of making similar diagnoses.

First, it is quick and portable. Results should be available in less than three minutes in almost all cases, from apparatus no larger than a suitcase.

Second, it makes a permanent record which identifies the subject person directly and accurately, and may record also his driver's license and clock and calendar data.

Third, the resulting permanent record requires no manual copying of data, with attendant possibilities for error. It is compact enough for easy long-term filing.

Fourth, the pupil images in the photographic prints can be quickly measured for diameter, either with magnifying devices or through scales photographed into the final prints. Much interpretation may be by simple visual comparison.

Fifth, court orders may not be required before such testing is legal. The taking of blood or urine is not needed. The subject is not searched, stripped, or handled.

Sixth all components are mechanically simple. The apparatus can be assembled from essentially standard products, so maintenance should be relatively simple.

Seventh, the equipment should be cheap to manufacture and maintain, and the photographs should cost not over 25 cents each, including development, when film is purchased in quantity.

Eighth, the equipment is essentially automatic and can be operated by almost anyone. A physician is not needed at this stage.

Ninth, the photographed results should be sufficiently clear-cut and unambiguous that physicians are not needed to interpret them, except perhaps in court. Usually, ordinary careful persons trained to the work should be able to make accurate tentative diagnoses.

Tenth, the several embodiments of this invention record a sufficient variety of eye-behavior data, that quite subtle diagnoses seem possible, especially after adequate test data has been accumulated and correlated with medical and bio-chemical experience.

Potentially, the effects of alcohol, tranquilizers, tobacco, and many household drugs may be detected, along with harder drugs, chemicals, and disease.

Eleventh, the operators can inspect each print as it is made. The failure of subjects to cooperate (as by closing their eyes) is known immediately, and their compliance can be secured before they are dismissed from the camera.

Twelfth, most of the eye-characteristics photographed by this sytem are involuntary in nature, outside of the subject's power to control. Thus, in most cases if the eyes are visible to the camera, valid data can be recorded.

BELIEVED LIMITATIONS OF THIS SYSTEM

This system has some clear disadvantages, of course. These include:

First, it depends solely upon drug, chemical, and disease effects which are visible in the eyes. No other data is taken, thus some individual subjects whose eyes resist betraying those effects may be mis-diagnosed. Similarly, some person's eyes may simulate such effects naturally, leading to equally wrong but opposite errors.

The number of persons whose eyes mask or mimic the abnormal symptoms recorded by this system is not known but is believed small.

Second, this system depends heavily upon clear photographic contrasts between the color of the subject's iris and the black of his pupil. Some dark-eyed people display little contrast here. Whether the self-developing type of color film will photograph such differentials is not known. Special films, or special illumination techniques may be required, such as the use of infrared rays.

Third, many of the embodiments of this system require taking several exposures upon one film. Each successive photograph reduces the overall quality and sharpness of the print.

However, special high-contrast self-developing films are available which accept more than two multiple-exposures without difficulty. The automatic electric-eye shutter controls of the cameras similarly prevent loss of detail through overexposure.

Fourth, some of the embodiments proposed under this system depend upon the subject's cooperation, such as the "moving object" and "emotional stimulation" versions. In these, the subject can refuse to look at the prepared stimuli, or not shift his gaze as directed, and so thwart the testing.

However, the other tests based upon light intensity seem nearly fool-proof; if the eyes can be photographed, data outside the subject's control will be recorded. Combining both types in one apparatus is recommended.

Of course, in suspected drug-abuse cases, the subject's refusal to cooperate can be ruled a prima-facie evidence of guilt.

While I have shown and described a particular form and variations of the invention and preferred ways of performing the method and procedures, this is by way of illustration only and does not constitute any limitation on my invention since various alterations, changes, deviations, eliminations, combinations, and departures may be made in what is disclosed herein without departing from the scope of my invention as defined only by proper interpretation of the appended claims.

I claim:

1. In a physiological diagnostic method for recording for observation and verification of possible physiognomical change in a subject's eyes for the purpose of trying to detect an abnormal reaction as would be expected to occur if the subject were under the influence of drugs, chemicals, ills or injuries, the steps comprising:
   a. positioning the subject for the purpose of photographing the eyes by a still camera,
   b. photographing at least one eye in the unstimulated condition to provide an image at a first position on a single fixed photo-sensitive sheet representing a single frame,
   c. causing a physiological stimulus of the subject which normally would be expected to provoke a change in at least one eye under normal conditions of body functions, photographing said one eye after said stimulus to provide a second image at a second position on the same said single frame, and
   d. comparing the aobve photographed images to provide an indication of the subjects reaction.

2. The diagnostic method in claim 1: including the use of light as the physiological stimulus.

3. The diagnostic method in claim 1: including as the stimulus the step of psychological provocation of the subject by making noise or showing the subject something.

4. The diagnostic method in claim 1: providing a pattern of motions visible to the subject to stimulate th subject's eyes to follow the pattern.

5. The method in claim 1: wherein the stimulus comprises increasing the light.

6. The steps in claim 1: including means for stimulating only one eye while the other eye remains in initial condition.

7. The steps in claim 1: wherein the positioning of the subject includes a box having a face opening therein, means on said box for positioning said face of the subject, lights in said box, a camera on said box having a lens seeing said subject's eyes, film in said camera.

8. The steps claimed in claim 1 wherein:
   there is a generally defined enclosure adapted to have lights visible therein,
   a face opening in said enclosure through which the face of the subject is visible,
   means mounting the camera so that the lens thereof may receive an image,
   light means mounted in front of said face opening and adapted to provide both ambient and increased or decreased light,
   means for operating the camera shutter to take a picture,
   and means for operating the lights to cause a change in the environmental conditions on the eyes of the subject positioned to be viewed through said face opening.

9. The steps as claimed in claim 8:
   electrical timing means including an electrical circuit wired to the means for operating the camera shutter and to the lights for automatically actuating same in sequence.

10. The steps as claimed in claim 9:
    said electrical timing means including an electrical motor and switching means operated thereby, there being switches for operating said camera shutter and said lights and said switches being actuated in sequence by said switching means.

11. The steps claimed in claim 1 wherein there is:
    a reflective means between said camera lens and said subject's face for directing the image to the camera.

12. The steps claimed in claim 11:
    said reflective means comprising at least one mirror.

13. The steps claimed in claim 12:
    including means for shifting said mirror from one position to another for the purpose of changing the position of the image in the camera.

14. The steps claimed in claim 12 wherein:
    there is a means for moving said mirror by remote control.

15. The steps as claimed in claim 13:
    said means for moving said mirror including an electrically responsive means for operating same.

16. The steps as claimed in claim 13:
    an electrical timing means for operating said camera, said light, and said mirror in sequence.

17. The steps as claimed in claim 9:
    said electrical timing means including an electrical motor and switching means operated thereby.

18. The steps as claimed in claim 15:
    there being switches operating said camera, said light and said mirror and said switches being actuated in sequence by said switching means.

19. The steps claimed in claim 1 wherein said stimulus includes:
    a plurality of lights in different positions and one or more of said lights providing a low level of illumination and one or more of said lights providing an increased illumination.

20. The steps claimed in laim 1 wherein said stimulus includes:
a plurality of lights viewable by the subject and arranged to illuminate in a pattern whereby the subject's eyes may follow same.

21. The steps claimed in claim 20:
said lights being electrically associated and there being a means for activating and actuating said lights in a pre-arranged sequence.

22. The steps claimed in claim 21:
said means comprising a switching means and switches for activating said lights.

23. The steps in claim 1:
said switch control means comprising a continuously driven member operated by said electrical motor and a plurality of switch cam members located on said continuously moving member.

24. The steps in claim 23:
said continuously moving member being an elongated shaft and said switch cam members being located in spaced relation thereon.

25. The steps in claim 24:
said camera shutter being operated by an electrical solenoid,
said solenoid being operated in a pre-arranged sequence.

* * * * *

UNITED STATES PATENT OFFICE
CERTIFICATE OF CORRECTION

Patent No. 3,782,364          Dated January 1, 1974

Inventor(s) John R. Watt

It is certified that error appears in the above-identified patent and that said Letters Patent are hereby corrected as shown below:

In the Abstract, "POLAROID" -type of camera, both occurrences, should read -- Polaroid Land camera --.

Column 2, lines 19 and 20, "basically conventional "POLAROID -type film" should read -- Polaroid Land film --;

line 38, "POLAROID camera" should read -- Polaroid Land camera --.

Column 3, line 22, "POLAROID or other" should be deleted.

line 28, "conventional POLAROID camera" should read -- Polaroid Land camera, for example, --.

Column 7, line 20, "POLAROID type" should read -- Polaroid Land --.

Column 13, line 24, "Polaroid or other" should be deleted.

Signed and sealed this 3rd day of September 1974.

(SEAL)
Attest:

McCOY M. GIBSON, JR.
Attesting Officer

C. MARSHALL DANN
Commissioner of Patents